United States Patent
Jiang et al.

(10) Patent No.: US 9,013,550 B2
(45) Date of Patent: Apr. 21, 2015

(54) ONLINE REFERENCE GENERATION AND TRACKING FOR MULTI-USER AUGMENTED REALITY

(75) Inventors: Bolan Jiang, San Diego, CA (US); Ashwin Swaminathan, San Diego, CA (US); Serafin Diaz Spindola, San Diego, CA (US); Dheeraj Ahuja, San Diego, CA (US); Charles Wheeler Sweet, III, San Diego, CA (US); Prasun Choudhury, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 13/082,187

(22) Filed: Apr. 7, 2011

(65) Prior Publication Data
US 2012/0062702 A1    Mar. 15, 2012

Related U.S. Application Data

(60) Provisional application No. 61/381,344, filed on Sep. 9, 2010.

(51) Int. Cl.
*H04N 13/02*    (2006.01)
*G06T 7/00*    (2006.01)

(52) U.S. Cl.
CPC ..... *G06T 7/0044* (2013.01); *G06T 2207/10004* (2013.01); *G06T 2207/30244* (2013.01)

(58) Field of Classification Search
CPC .......... G06T 2207/10004; G06T 2207/30244; G06T 7/0044
USPC .......................................................... 348/46
See application file for complete search history.

(56) References Cited

U.S. PATENT DOCUMENTS 6,353,679 B1 * 3/2002 Cham et al. ................... 382/228
7,671,916 B2    3/2010 Hashimoto
(Continued)

FOREIGN PATENT DOCUMENTS

JP    2007033087 A    2/2007

OTHER PUBLICATIONS

Gaivimeter, S., et al , "Server-side object recognition and client-side object tracking for mobile augmented reality", Computer Vision and Pattern Recognition Workshops (CVPRW), 2010 IEEE Computer Society Conference, Jun. 13-18, 2010, pp. 1-8.
(Continued)

*Primary Examiner* — Dave Czekaj
*Assistant Examiner* — Mohammad J Rahman
(74) *Attorney, Agent, or Firm* — Jennifer M. Pascua (57) ABSTRACT

A multi-user augmented reality (AR) system operates without a previously acquired common reference by generating a reference image on the fly. The reference image is produced by capturing at least two images of a planar object and using the images to determine a pose (position and orientation) of a first mobile platform with respect to the planar object. Based on the orientation of the mobile platform, an image of the planar object, which may be one of the initial images or a subsequently captured image, is warped to produce the reference image of a front view of the planar object. The reference image may be produced by the mobile platform or by, e.g., a server. Other mobile platforms may determine their pose with respect to the planar object using the reference image to perform a multi-user augmented reality application.

43 Claims, 4 Drawing Sheets

(56) References Cited

U.S. PATENT DOCUMENTS

| | | | |
|---|---|---|---|
| 2010/0097444 A1* | 4/2010 | Lablans | 348/46 |
| 2010/0208033 A1 | 8/2010 | Edge et al. | |
| 2010/0208057 A1 | 8/2010 | Meier et al. | |
| 2010/0220891 A1 | 9/2010 | Lefevre et al. | |
| 2010/0287485 A1 | 11/2010 | Bertolami et al. | |
| 2011/0102550 A1* | 5/2011 | Daniel et al. | 348/46 |
| 2011/0115671 A1 | 5/2011 | Sweet, III et al. | |
| 2011/0115902 A1 | 5/2011 | Jiang et al. | |
| 2011/0128352 A1* | 6/2011 | Higgins et al. | 348/46 |
| 2011/0205340 A1* | 8/2011 | Garcia et al. | 348/46 |
| 2012/0011142 A1 | 1/2012 | Baheti et al. | |

OTHER PUBLICATIONS

Klein G. et al., "Parallel Tracking and Mapping on a Camera Phone", 2009 8th IEEE International Symposium on Mixed and Augmented Reality (ISMAR), Oct. 19-22, 2009, pp. 83-86.

Lee, W., et aL, "Point-and-Shoot for Ubiquitous Tagging on Mobile Phones", 2010 9th IEEE International Symposium on Mixed and Augmented Reality (ISMAR), Oct. 13-16 2010. pp. 57-64.

Evers-Senne, et al., "A Mobile Augmented Reality System with Distributed Tracking", 3D Third International Symposium on Data Processing, Visualization and Transmission, IEEE, PI, Jun. 1, 2006, pp. 583-590, XP031078991, DOI: 10.1109/3DPVT.2006.14, ISBN: 978-0-7695-2825-0.

International Search Report and Written Opinion—PCT/US2011/051109—ISA/EPO—Dec. 23, 2011.

Lee, et al., "Monitoring Activities from Multiple Video Streams: Establishing a Common Coordinate Frame", IEEE Transactions on Pattern Analysis and Machine Intelligence, IEEE Service Center, Los Alamitos, CA, US, vol. 22, No. 8, Aug. 1, 2000, pp. 758-767, XP000976483, ISSN: 0162-8828, DOI: 10.1109/34.868678.

Li, et al., "Computing homography with RANSAC algorithm: a novel method of registration", Proceedings of the SPIE—The International Society for Optical Engineering, USA, vol. 5637, No. 1, Feb. 8, 2005, pp. 109-112, XP040196887, ISSN: 0277-786X.

Simon, et al., "Markerless tracking using planar structures in the scene", Augmented Reality, 2000, (ISAR 2000), Proceedings, IEEE and ACM International Symposium on Munich, Germany Oct, 5-6, 2000, Piscataway, NJ, USA,IEEE, US, Oct. 5, 2000, pp. 120-128, XP010520321, DOI: 10.1109/ISAR.2000.880935, ISBN: 978-0-7695-0846-7.

Bradski G., et al., "Learning OpenCV", O'Reilly Japan. Inc., Aug. 24, 2009, first edition, p. 388, 395-396.

* cited by examiner

ONLINE REFERENCE GENERATION AND TRACKING FOR MULTI-USER AUGMENTED REALITY

CROSS-REFERENCE TO PENDING PROVISIONAL APPLICATION

This application claims priority under 35 USC 119 to U.S. Provisional Application No. 61/381,344, filed Sep. 9, 2010, and entitled "Online Reference Generation And Tracking For Multi-User Augmented Reality" which is assigned to the assignee hereof and which is incorporated herein by reference.

BACKGROUND

An augmented reality system can insert virtual objects in a user's view of the real world. One key requirement of a successful augmented reality system is a tracking system that can estimate the user's position and orientation (pose) accurately relative to a reference. Otherwise, the virtual objects will appear at the wrong location or float around the environment. In a multi-user augmented reality system, the virtual objects need to appear at the same location in the environment from each user's unique perspective. Thus, each user's unique pose with respect to the environment needs to be estimated relative to the same reference.

Conventional tracking systems for multi-user augmented reality systems require a previously acquired common reference. The reference could be a 3D model of the environment, artificial markers placed in the environment or the front view image of a planar surface in the environment. Thus, such augmented reality systems only operate in a known environment. However, it is not always convenient or possible to obtain the reference beforehand. The dependency on the prior knowledge of the environment greatly limits the usage of multi-user augmented reality technology.

There are tracking technologies such as Georg Klein and David Murray, "Parallel Tracking and Mapping on a Camera Phone," 2009 8th IEEE International Symposium on Mixed and Augmented Reality (ISMAR), Oct. 19-22, 2009, pp. 83-86, which do not need prior knowledge of the environment. However, these technologies only estimate a user's pose relative to an arbitrary reference and cannot be used for multi-user augmented reality applications.

A point-and-shoot method, as described in W. Lee, Y. Park, V. Lepetit, W. Woo, "Point-and-Shoot for Ubiquitous Tagging on Mobile Phones," 2010 9th IEEE International Symposium on Mixed and Augmented Reality (ISMAR), Oct. 13-16, 2010, pp. 57-64, estimates poses for multiple users. In the point-and-shoot method, the orientation of the camera is estimated by on-board accelerometers. The image is warped to the frontal view and a set of "mean patches" are generated. Each mean patch is computed as an average of patches over a limited range of viewpoints, and a number of ranges mean patches are produced to cover all possible views. By comparing each incoming image with the mean patches, the pose can be estimated. The point-and-shoot method, however, relies on motion sensors to generate the front view image, and therefore requires additional components in the camera and is subject to errors caused by the motion sensors. Additionally, the point-and-shoot method relies on a plurality of mean patches. Further, the point-and-shoot method only works on vertical or horizontal planar surfaces, which is limiting.

Accordingly, an improved system that can estimate the poses for multiple users in a previous unknown scene is desired.

SUMMARY

A multi-user augmented reality (AR) system operates without a previously acquired common reference by generating a reference image on the fly. The reference image is produced by capturing at least two images of a planar object and determining a pose (position and orientation) of a first mobile platform with respect to the planar object using the at least two images. An image of the planar object, which may be one of the initial images or a subsequently captured image, is warped using the orientation of the first mobile platform to produce the reference image of a front view of the planar object. A pose of a second mobile platform with respect to the planar object is determined using an image of the planar object captured by the second mobile platform and the reference image. Determining the pose of the first mobile platform and/or warping the image to produce the reference may be performed by the first mobile platform or a server. In addition, if desired, the reference image may be extended to include a new image that contains a portion of the planar object that is not included in the reference image. For example, the second mobile platform may capture a new image that includes a different portion of the planar object, which is not included in the reference image. The new image and the reference image may be merged to generate a new reference image of the front view of the planar object and the pose of second mobile platform with respect to the planar object may be updated using a subsequent image of the planar object captured by the second mobile platform and the new reference image.

In another aspect, an apparatus includes an interface for receiving at least two images to be processed, at least one of the at least two images captured by a first camera and containing different views of a planar object. For example, the interface may be the interface between the first camera and processor in a mobile platform or may be an external interface in a server that receives the images from a mobile platform. The apparatus further includes a data transmitting interface and a processor connected to the interface for receiving at least two images to be processed and the data transmitting interface, and memory connected to the processor. Software held in memory and run in the processor causes the processor to analyze the at least two images of the planar object and to determine a pose (position and orientation) of the first camera with respect to the planar object using the at least two captured images. The software further causes the processor to warp an image of the planar object using the orientation to produce a reference image of a front view of the planar object and to transmit the reference image to at least one mobile platform with a second camera via the data transmitting interface to perform a multi-user augmented reality application using the reference image. If desired, the software held in the memory and run in the processor may further cause the processor to merge the reference image and a new image that includes a portion of the planar object that is not included in the reference image to generate a new reference image of the front view of the planar object and to transmit the new reference image to the at least one other mobile platform via the data transmitting interface to perform the multi-user augmented reality application using the new reference image.

In another aspect, a mobile platform includes a camera, a wireless transceiver, a processor connected to the camera and wireless transceiver, memory connected to the processor, and a display connected to the memory. Software held in the memory and run in the processor causes the processor to analyze at least two captured images of a planar object and to determine a pose (position and orientation) of the mobile platform with respect to the planar object using the at least two captured images, to warp an image of the planar object using the orientation to produce a reference image of a front view of the planar object, to transmit the reference image to at least one other mobile platform, and to perform a multi-user augmented reality application with the at least one other mobile platform using the reference image and that is displayed on the display.

In another aspect, a system includes means for capturing at least two images of a planar object and means for determining a pose (position and orientation) of a first mobile platform with respect to the planar object using the at least two images. The system further includes means for warping an image of the planar object using the orientation of the first mobile platform with respect to the planar object to produce a reference image of a front view of the planar object, and means for determining a pose of a second mobile platform with respect to the planar object using an image of the planar object captured by the second mobile platform and the reference image. If desired, the system may include means to merge the reference image and a new image that includes a portion of the planar object that is not included in the reference image to generate a new reference image of the front view of the planar object. In such a system, the means for determining the pose of a second mobile platform updates the pose of the second mobile platform with respect to the planar object using a different image of the planar object captured by the second mobile platform and the new reference image.

In yet another aspect, a computer-readable medium including program code stored thereon includes program code to analyze at least two images of a planar object to determine a pose (position and orientation) of a camera that captured at least one of the at least two images with respect to the planar object and program code to warp an image of the planar object using the orientation to produce a reference image of a front view of the planar object. The computer-readable medium further includes program code to transmit the reference image, and program code to perform a multi-user augmented reality application using the reference image. If desired, the computer-readable medium may further include program code to merge the reference image and a new image that includes a portion of the planar object that is not included in the reference image to generate a new reference image of the front view of the planar object, program code to transmit the new reference image, and program code to perform the multi-user augmented reality application using the new reference image.

DETAILED DESCRIPTION

Figure 1:
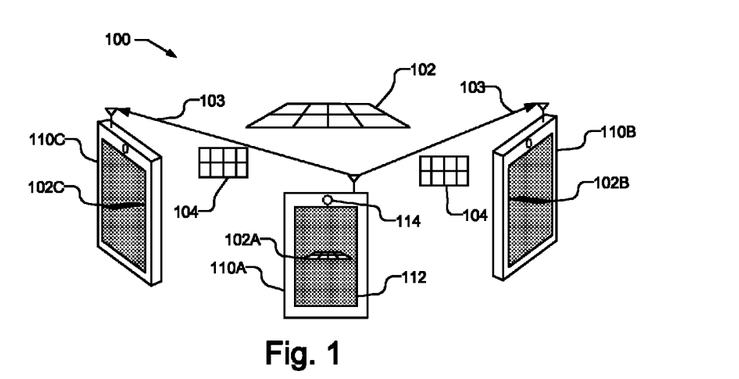
FIG. 1 illustrates a multi-user augmented reality (AR) system that operates without a previously acquired common reference.

FIG. 1 illustrates a multi-user augmented reality (AR) system 100 that operates without a previously acquired common reference. The multi-user AR system 100 includes a first mobile platform 110A, sometimes referred to as the master device 110A, and additional mobile platforms 110B, and 110C, sometimes collectively referred to as mobile platforms 110. Each mobile platform 110 includes a back facing camera 114 for imaging the environment. The master device 110A at least partially performs an initialization process by capturing a plurality of images (one image is illustrated as 102A in display 112) of a planar object 102 from different viewpoints. From the multiple captured images, the pose (position and orientation) of the master device 110A with respect to the object 102 can be determined, from which a reference image 104 can generated and then distributed (as illustrated by arrows 103) to the other mobile platforms 110B and 110C, which are viewing the same planar object 102, as illustrated by images 102B and 102C, respectively. Using the reference image 104, each mobile platform 110A, 110B, and 110C may track the object 102 by determining its unique pose with respect to the object 102 in order to perform a multi-user AR application. It should be understood that the mobile platform may be any portable electronic device such as a cellular or other wireless communication device, personal communication system (PCS) device, personal navigation device (PND), Personal Information Manager (PIM), Personal Digital Assistant (PDA), laptop, camera, or other suitable mobile device that is capable of augmented reality (AR).

Figure 2:
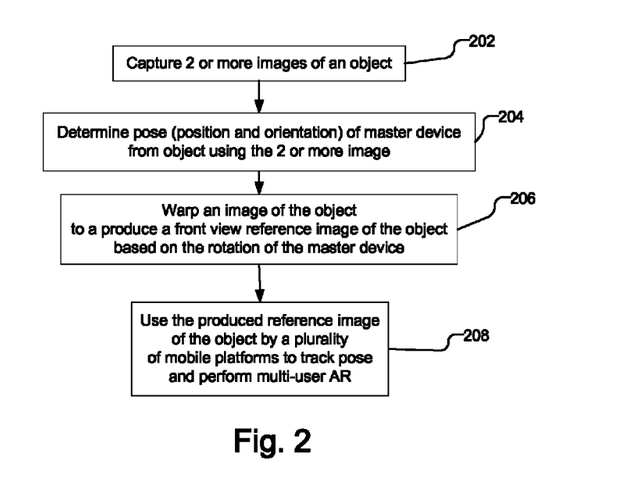
FIG. 2 is a flow chart describing the process of performing AR with multi-users without a previously acquired common reference.

FIG. 2 is a flow chart describing the process of performing AR with multi-users without a previously acquired common reference. The master device 110A captures two or more images of an object 102 with the back facing camera 114 (202). It should be understood that as used herein, a captured image may be a still image or a video frame. The two or more images of the object 102 are captured by the master device 110A at different viewpoints, i.e., poses with respect to the object 102, or by different mobile platforms 110A and 110B having different viewpoints. Using the plurality of captured images, the pose (position and orientation) of the master device 110A with respect to the object 102 is determined (204). An image of the object 102, which may be one of the initial images captured by the master device 110A or a new or different image of the object 102, is then warped based on the orientation of the master device 110A to produce a reference image 104 as a front view of the object 102 (206) as illustrated by arrow 106 in FIG. 3. The reference image 104 is used as the common reference image from which each mobile platform 110 may determine its unique pose with respect to the object for tracking to perform multi-user AR (208).

As illustrated in FIG. 1, the master device 110A may determine its pose (step 204 in FIG. 2) and warp the image of the object (step 206 in FIG. 2) and transmit the reference image 104 to the other mobile platforms 110B and 110C, as illustrated by arrows 103. The master device 110A, as well as the other mobile platforms 110B and 110C, may then use the produced reference image 104 to determine their respective poses with respect to the object in the AR application.

Figure 4:
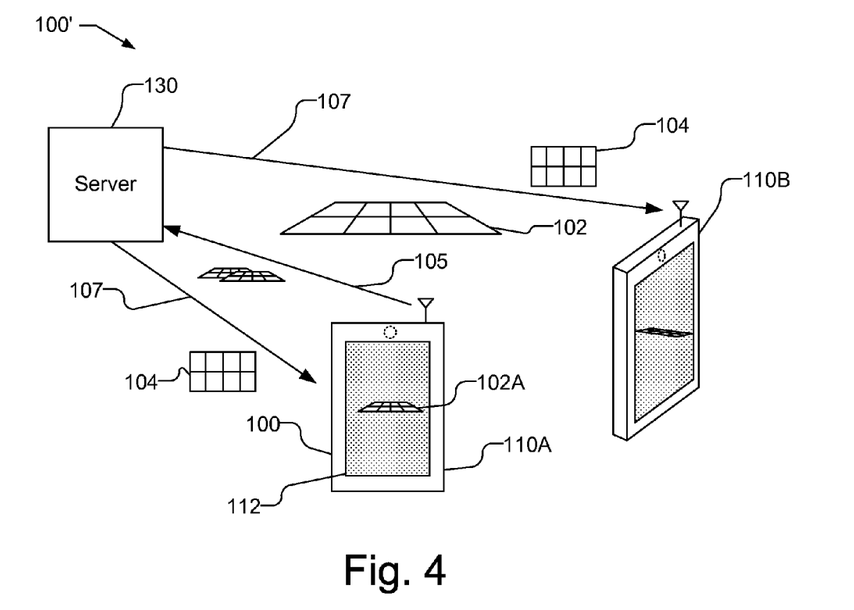
FIG. 4 illustrates a multi-user AR system that operates without a previously acquired common reference and uses a server to generate the reference image.

If desired, however, one or more of the processes may be performed remotely from the master device 110A. For example, a separate server may be used to perform one or more of the initialization functions. As illustrated FIG. 4, in the multi-user AR system 100' the master device 110A may capture multiple images of the object 102 (one image is illustrated as 102A in display 112 of FIG. 4) (step 202 in FIG. 2) and may transmit the captured images (as illustrated by arrow 105) to a server 130. The server 130 may then use the captured images to determine the pose of the master device 110A (step 204 in FIG. 2) and warp the image of the object 102 to produce the reference image 104 (step 206 in FIG. 2). The server 130 then transmits the reference image 104 to the master device 110A and other mobile platforms (only mobile platform 110B is shown in FIG. 4), as illustrated by arrows 107. If desired, the master device 110A may determine the pose (step 204 in FIG. 2), and transmit the pose along with an image associated with the pose to the server 130. The server 130 then warps the image (step 206 in FIG. 2) and transmits the reference image 104 to the master device 110A and mobile platform 110B. Alternatively, instead of using a server 130, one or more of the process steps may be performed by one or more the other mobile platforms 110B and 110C. For example, the master device 110A (or the master device 110A and another mobile platform 110B) may capture multiple images of the object 102 (step 202 in FIG. 2) and the captured images from the master device 110A may be transmitted to another mobile platforms 110B. The other mobile platforms 110B may determine the pose of the master device 110A (step 204 in FIG. 2) and warp one of the images of the object 102 to the reference image 104 (step 206 in FIG. 2) and transmit the warped image to the other mobile platforms, including the master device 110A. Alternatively, the captured multiple images of the object 102 (step 202 in FIG. 2) may be transmitted to each of the other mobile platforms 110B and 110C, which then independently determine the pose of the master device 110A (step 204 in FIG. 2) and warp one of the images of the object 102 to the reference image 104 (step 206 in FIG. 2). If desired, the master device 110A may determine the pose (step 204 in FIG. 2), and transmit the pose along with an image associated with the pose to the other mobile platforms 110B and 110C. The other mobile platforms 110B and 110C then independently warp the image (step 206 in FIG. 2) to the front view.

Figure 5:
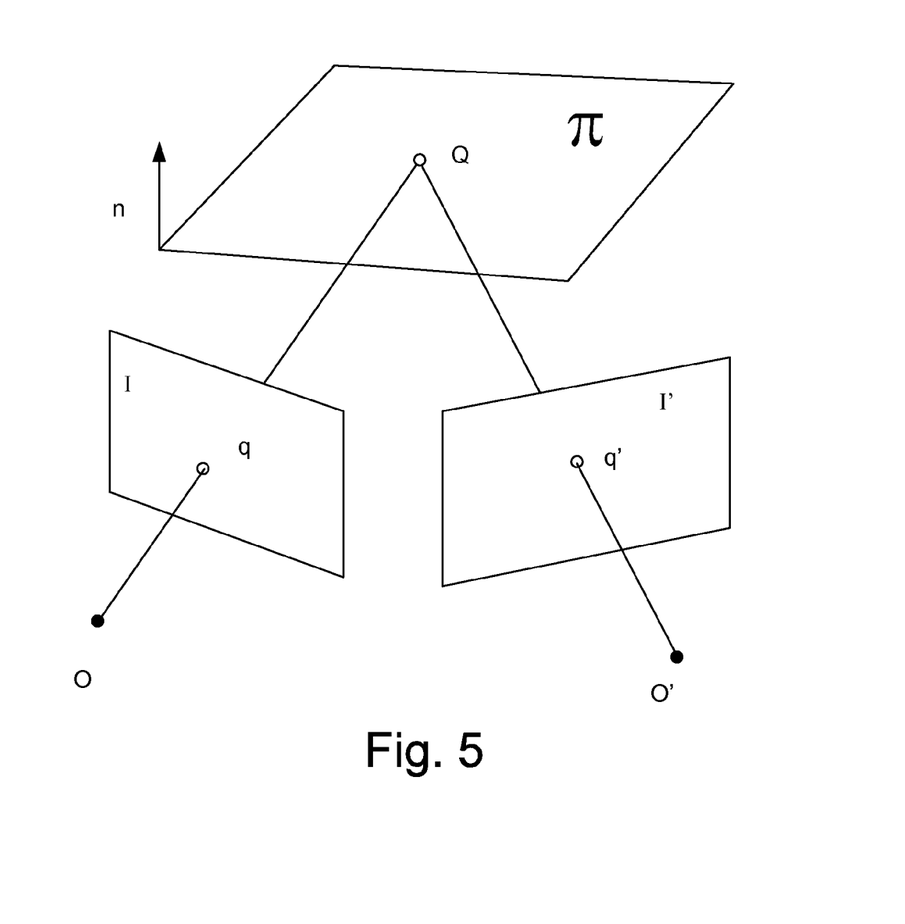
FIG. 5 illustrates a 3D point on a plane and the 2D projection of the 3D point on two images with different views of the plane.

FIG. 5 illustrates a 3D point Q on a plane π and the 2D projection q, q' of the 3D point Q on two respective images I, I' with different views of the plane π to illustrate determining the pose of the master device 110A using the following notation.

A 3D point $Q=(X,Y,Z)^T$ is related to its 2D projection $q=(x,y,1)^T$ on a camera image by a 3×4 projection matrix P as $$q \cong PQ \qquad \text{eq. 1}$$

where $\cong$ represents equality up to a scale factor, and $$P=K[R|t] \qquad \text{eq. 2}$$

where R represents the rotation, represents the translation, and K represents intrinsic camera parameters.

As shown in FIG. 5, if a 3D point Q on a plane π is viewed on two images I' and I, its 2D projections $q'=(x',y',1)$ on image I' and the projection $q=(x,y,1)$ on image I are related by a 2D-2D homography h as $$q' \cong hq. \qquad \text{eq. 3}$$

If the projection matrix for image I is K[I|0] and the projection matrix for image I' is K'[R'|t'], then $$h = K'\left(R' + \frac{t'n^T}{d}\right)K^{-1} \qquad \text{eq. 4}$$

where $n^TQ=d$ for any 3D point $Q \in \pi$, n is a unit vector in the direction of the plane normal and d is the distance from the origin to the plane. If the same camera is used to produce both images I and I', the intrinsic camera parameter will be not change, i.e., K'=K. The values of n and d are defined in the camera coordinate frame for the image I.

A 3D point on the plane π and its 2D projection q on a camera image is related by a 3D-2D homography H as $$q \cong HQ. \qquad \text{eq. 5}$$

If a world coordinate frame is defined in which the z axis is aligned with the plane normal and the origin is on the plane, then the homography H has the format $$H \cong K[r_1 r_2 t] \qquad \text{eq. 6}$$

where $r_1$ and $r_2$ are the first and second columns of the rotation matrix R and t is the translation vector defined in equation 2.

During the initialization process of the multi-user augmented reality system 100, the users, i.e., mobile platforms 110A, 110B, and 110C view the same planar surface, e.g., object 102 in FIG. 1, which serves as the ground plane for augmentation. The intrinsic camera parameter K of the master device 110A is calibrated beforehand and stays the same during the entire process. The master device 110A is moved with respect to the object 102 to capture images of the object 102 from different viewpoints. If desired, the initial images may be captured by different devices at different viewpoints, e.g., the master device 110A may capture one image and another mobile platform 110B may capture another image, which is then transmitted to master device 110A (or server 130) along with the intrinsic camera parameters K' of the other mobile platform 110B. For each captured image or video frame, features are extracted from each captured image. Features may be extracted using a well-known technique, such as Scale Invariant Feature Transform (SIFT), which localizes features and generates their descriptions. If desired, other techniques, such as Speed Up Robust Features (SURF), Gradient Location-Orientation Histogram (GLOH), Compressed Histogram of Gradients (CHoG) or other comparable techniques may be used. When the number of extracted features for an image exceeds a threshold, e.g., 100 point features, the image is saved as the initial images and the extracted features are defined as reference points. Subsequent images are similarly processed until there are at least two images with extracted features from each image defined as reference points.

The pose of the master device 110A is determined based on the at least two images and the defined reference points (step 204 in FIG. 2). To determine the pose, the dominant plane is detected by computing the 2D-2D homography h between the initial image and at least one subsequent image. The homography h is initialized as the identity matrix when the initial image is saved. For each subsequent image, the reference points from the initial image are projected on the subsequent image by the homography h. The corresponding points in the subsequent image are searched around each projected reference point. The value of homography h is updated using RANdom SAmpling Consensus (RANSAC) optimization approach to compute the homography from the corresponded point pairs. If desired, other techniques may be used to track 2D points across a sequence of images, such as optical flow, and thus, any 2D point tracking or matching method can be used for detecting the dominant plane.

The homography h can be decomposed into relative camera motion [R'|t'] and the plane normal n as described above. However, if the translation motion for the camera of the master device 110A between captured images is too small, the decomposed plane normal n would not be accurate. Accordingly, a metric S may be defined as the ratio of the maximum and minimum eigenvalues of h$^t$h, where the homography h is decomposed into relative camera motion [R'|t'] and the plane normal n after the metric S exceeds a threshold, e.g., 2.0.

For a 3D point Q on the plane π, its 2D projection q and the center of the camera 114, illustrated in FIG. 5 as point O, forms a ray. After intersecting the ray with the plane π, the coordinate for the 3D point Q can be determined. The plurality of reference points, correspond to a plurality of 3D points, which form a 3D plane. Generally, there are two solutions for homography decomposition. To select the correct solution, the two resulting 3D planes are stored and used to estimate the master device 110A pose in subsequent frames. When the average projection error for one plane is greater than the average projection error for the other plane, e.g., one is 1.2 times greater; the plane having the larger projection error is eliminated. If the initial image is roughly a front view of the planar object 102, the plane normal n may be used to select the correct 3D plane. After the correct 3D plane is selected, a world coordinate frame is defined to align the z-axis with the plane normal n with the origin on the plane. Thus, with the 3D-2D homography H determined, the pose of the master device 110A with respect to the object 102 is determined based on the rotation matrix R and translation vector t as discussed above with reference to equation 6. If desired, other pose determination techniques may be used.

Figure 3:
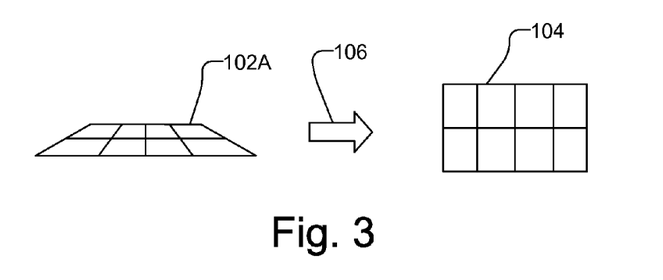
FIG. 3 illustrates warping an image of a planar object to a reference image of a front view of the planar object.

The front view of the planar object 102 is then generated (step 206 in FIG. 2). For example, the 3D points on the object 102 and their 2D projections on an image may be used to estimate the projection matrix P=K[R|t]. The rotation R and translation t can be estimated from the 3D-2D homography H. The first column $r_1$ and second column $r_2$ of R are from the first and second column of H. The third column of R may be created as $r_3=r_1 \times r_2$. The translation t is the third column of H. As illustrated in FIG. 3, the image 102A can be warped to the front view reference image 104 using only the rotation $R^{-1}$ as illustrated by arrow 106. However, if desired, the homography H between the 3D plane and its 2D projection on an image can be used, i.e., $H^{-1}$, to warp the image. After warping the image to the front view using orientation, the frontal view image can be scaled and translated anywhere on the plane. For example, the lower left corner of the image after being projected on to the plane is determined and used for the translation. Similarly, the ratio of the diagonal of the image and its projection may be used to derive the scaling factor (scale).

Additionally, if desired, instead of using one of the initial captured images, a new image of the object 102 may be captured and warped to produce the reference image 104, however, the pose for the new image should be determined, e.g., using the previously determined pose and vision based tracking with the new image, and the orientation used to warp the new image. If, however, the angle α between the viewing direction of the camera 114 and the plane normal n is too large, the quality of the reference image may not be of sufficient quality for pose estimation. The angle α may be computed as $$\alpha = \cos^{-1}(r_{33}), \quad \text{eq. 7}$$

where $r_{33}$ is the third element on the third column of the rotation matrix R.

Thus, to generate a high quality reference image, the angle α is determined for the initial captured image and/or the current captured image. If the angle α is smaller than a threshold, e.g., 8 degrees, then the corresponding image is warped to the front view. If the angle α for the captured images is larger than the threshold, additional images may be captured and used. For example, additional images may be captured and their angle α compared to the threshold until a suitable image is found. Alternatively, M additional images may be captured by the master device 110A and the image with the smallest angle α is warped to the front view as the reference image. The reference image may then be sent to the other mobile platforms 110B and 110C. Because the reference image is a standard image, the existing network protocol and image standard may be used to compress, send and decompress the reference image.

If desired, instead of using a single image to generate the reference image 104, multiple images may be used to produce a high resolution reference image. For example, multiple images may be captured and averaged together to produce a final high resolution reference image. For example, a reference image may be generated from N captured images. For each pixel in the reference image, each candidate image is searched for a corresponding pixel. If there are multiple correspondences in different candidate images, the average of the pixel values of the correspondences is used as the pixel value on the reference image After each mobile platform receives the reference image 104, which may be received from the master device 110A, a server 130, or independently produced by each mobile platform, the reference image 104 may be used as the common reference image from which each mobile platform 110 may determine its pose for tracking in order to perform a multi-user AR application (step 208, FIG. 2). To determine the pose of a mobile platform with respect to the reference image, first, features, such as point features or line features, or other appropriate features, are detected on the reference image 104 and descriptors are built for each feature. Features may be extracted using a well-known technique, such as SIFT, SURF, GLOH, CHoG, as discussed above. Each mobile platform 110 may independently extract point features so that only the reference image 104 need be transmitted to the mobile platforms 110, which may performed using existing network protocol and image standards. The reference image 104 is the front view of the object 102 and therefore, for any detected 2D point (x,y) in the reference image 104, the corresponding 3D point can be defined as (sx, sy, 0) where s is a constant and it is the same for all mobile platforms 110. This coordinate definition makes the z axis of the world coordinate system align with the plane normal and makes the origin of the world coordinate on the plane. Other definitions of the coordinates are possible if desired. The 2D projections of the 3D points are then searched in each subsequently captured image from a mobile platform. The pose of the mobile platform with respect to the object 102 can then be estimated using the matched 3D-2D point pairs.

If desired, the original reference image 104 may be extended and the extended reference image may be distributed to the other mobile platforms. During the initialization process, the cameras of participating mobile platforms are pointed to capture images from the same part of the object 102. The master device 110A captures images from different perspectives and using the images from different perspectives, the reference image is generated, which can then be transmitted to the other users. Each mobile platform continues to capture images of the object 102 and uses the reference image to estimate the pose for a current image. If a significant part of the current image is not visible in the reference image, the reference image and current image may be merged to generate a new reference image, which can be transmitted to the other mobile platforms.

To extend the reference image, the 2D points are detected on the reference image and their 2D correspondents are searched in the current image. If a significant difference between the reference image and current image exists, the homography h is computed based on the matched point pairs, as discussed above. A new reference image may be generated by merging the reference image and the current image. For example, the pixels on the original reference image may be transformed to the new reference image through identity transformation and the pixels on the current image may be transformed to the new reference image through the homography h.

There are several ways to decide whether there is a significant difference between the reference image and current image. For example, the camera motion between the two images may be used to decide if a significant difference exists, where the camera motion is determined using vision based techniques described herein or by on-board motions sensors, such as accelerometers and gyroscopes. Another way to determine if a significant difference exists is to detect points on the reference image and their correspondences on a current image. The enclosed rectangle of the points on the current image can then be computed. The ratio r may be defined as the ratio for the area of the rectangle to the area of the current image. If r is below desired threshold, the difference between the two images may be considered significant.

The extended reference image may be produced, e.g., by all mobile platforms 110B and 110C sending images that are significantly different from the reference image to the master device 110A or server 130. The master device 110A or server 130 may extend the reference image by merging the received images from the different mobile platforms and transmit the extended reference image to the other mobile platforms. If the extended reference image is too large to be distributed over a network, the extended reference image may be divided into tiles and the extend reference image distributed tile by tile. Alternatively, the tiles may be integrated into a video file and distributed as a video.

Figure 6:
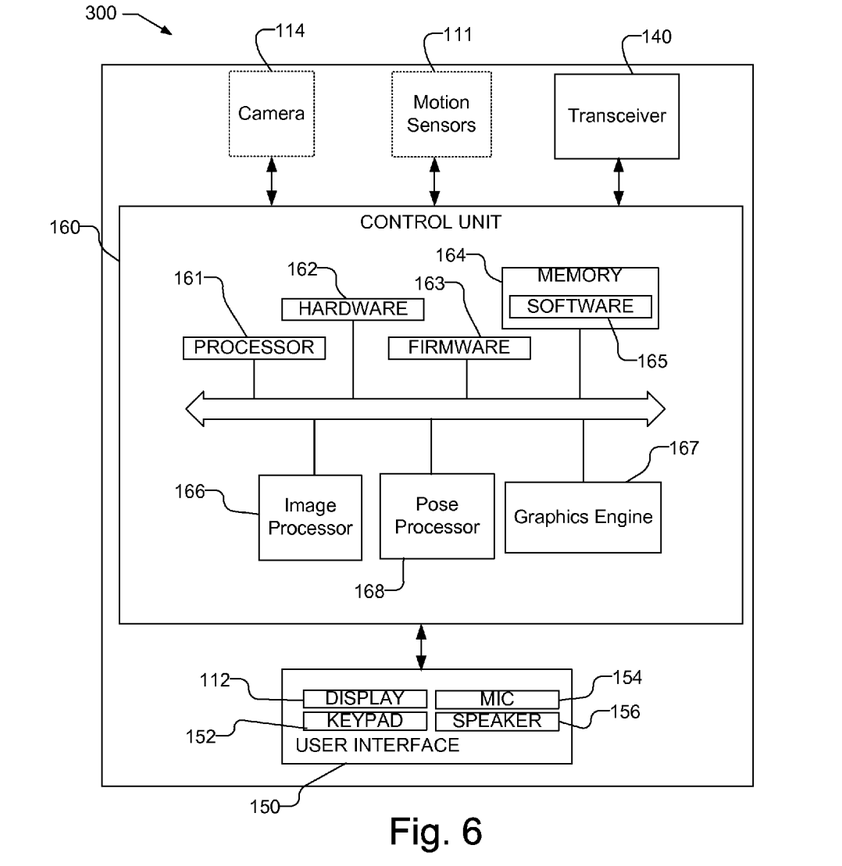
FIG. 6 is a block diagram of a device, such as a mobile platform or server, capable of performing an initialization process for a multi-user AR system.

FIG. 6 is a block diagram of a device 300 capable of performing an initialization process for a multi-user AR system, as described above. The device 300 shown in FIG. 6 may be, e.g., the master device 110A or server 130. The device 300 includes an interface for receiving the images to be processed, a data transmitting interface, and a processor 161. For example, where the device 300 is the master device 110A, the interface for receiving the images to be processed may be the interface between camera 114 and the processor 161 and the data transmitting interface may be a transceiver 140. Where the device 300 is the server 130, and thus, does not include a camera 114, the interface for receiving the images to be processed and the data transmitting interface may be the transceiver 140. Thus, the device 300 includes a means for transmitting data, such as a reference image or initial captured images. The means for transmitting data may be a wireless transceiver 140 such as a cellular modem or a wireless network radio receiver/transmitter that is capable of sending and receiving communications to and from a cellular tower or from a wireless access point when the device 300 is a mobile platform. Alternatively, when the device 300 is a server, the transceiver may be a wired communication interface, e.g., for sending and receiving signals via Ethernet or any other wired format.

Where the device 300 is a mobile platform, the device 300 further includes a means for capturing an image of a planar object, such as camera 114 and may optionally include motion sensors 111, such as accelerometers, gyroscopes, electronic compass, or other similar motion sensing elements. The device 300 may further includes a user interface 150 that includes a means for displaying the image and AR objects, such as the display 112. The user interface 150 may also include a keypad 152 or other input device through which the user can input information into the device 300. If desired, the keypad 152 may be obviated by integrating a virtual keypad into the display 112 with a touch sensor. The user interface 150 may also include a microphone 154 and speaker 156, e.g., if the device 300 is a mobile platform such as a cellular telephone. Of course, device 300 may include other elements unrelated to the present disclosure, such as a satellite position system receiver.

The device 300 also includes a control unit 160 that is connected to and communicates with the transceiver 140 and user interface 150, as well as camera 114 and optional motion sensors 111 when device 300 is a mobile platform. The control unit 160 accepts and processes images captured by camera 114 and controls the transceiver 140 and display 112. The control unit 160 may be provided by a processor 161 and associated memory 164, hardware 162, software 165, and firmware 163. The control unit 160 may include an image processor 166 for processing the initial images from the camera 114 to determine the 2D-2D homography h and to determine the 3D-2D homography H, and define the world coordinate frame, as discussed above. The control unit 160 may further include a graphics engine 167, which may be, e.g., a gaming engine, to warp one of the initial images (or a different image) to a front view reference image 104, which is transmitted to other mobile platforms via transceiver 140. The graphics engine 167 may also render desired AR objects to be displayed on the display 112. The control unit may also include a pose processor 168 to determine and track the position and orientation of the master device 110A with respect to the object 102 based on images from the camera 114 and the reference image 104. The image processor 166, graphics engine 167 and pose processor 168 are illustrated separately from processor 161 for clarity, but may be part of the processor 161 or implemented in the processor based on instructions in the software 165 which is run in the processor 161. It will be understood as used herein that the processor 161 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

Thus, the multi-user AR systems 100 and 100' shown in FIGS. 1 and 4, respectively, include means for capturing at least two images of a planar object from a first mobile platform, which may include camera 114, and means for determining a position and orientation of the first mobile platform with respect to the planar object using the at least two images, which may include the image processor 166 and pose processor 168. The system further includes means for warping an image of the planar object using the orientation with respect to the planar object to produce a reference image of a front view of the planar object, which may include image processor 166, pose processor 168, and graphics engine 167. The system further includes means for determining a position and orientation of a second mobile platform with respect to the planar object using an image of the planar object captured by the second mobile platform and the reference image, which may include an image processor 166 and pose processor 168 that is in a second mobile platform 110B. If desired, the system may further include means to merge the reference image and a new image that includes a portion of the planar object that is not included in the reference image to generate a new reference image, which may include image processor 166, pose processor 168, and graphics engine 167 that may be located in a master device 110A, server 130, or second mobile platform 110B, and the means for determining the position and orientation of a second mobile platform updates the position and orientation of the second mobile platform with respect to the planar object using a different image of the planar object captured by the second mobile platform and the new reference image.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161.

If implemented in firmware and/or software, the functions may be stored as one or more instructions or code on a computer-readable medium. Examples include non-transitory computer-readable media encoded with a data structure and computer-readable media encoded with a computer program. For example, the computer-readable medium including program code stored thereon may include program code to analyze at least two images of a planar object to determine a position and orientation of a camera that captured at least one of the at least two images with respect to the planar object, program code to warp an image of the planar object using the orientation to produce a reference image of a front view of the planar object, program code to transmit the reference image, and program code to perform a multi-user augmented reality application using the reference image. If desired, the computer-readable media may further include program code to merge the reference image and a new image that includes a portion of the planar object that is not included in the reference image to generate a new reference image of the front view of the planar object, program code to transmit the new reference image, and program code to perform the multi-user augmented reality application using the new reference image. Computer-readable media includes physical computer storage media, and does not refer to a transitory propagating signal. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising: capturing at least two images of a planar object; determining a first pose, comprising a position and an orientation, of a first mobile platform with respect to the planar object using the at least two images; warping an image of the planar object captured by the first mobile platform using the orientation of the first mobile platform with respect to the planar object to produce a reference image of a front view of the planar object; and determining a second pose of a second mobile platform with respect to the planar object using a second image of the planar object captured by the second mobile platform and the reference image; wherein determining the first pose, comprising the position and the orientation, of the first mobile platform with respect to the planar object comprises: extracting features from the at least two images; computing a 2D-2D homography h between the at least two images using the features; computing 3D coordinates for the features to define a 3D plane that corresponds to a plane of the planar object; computing a 3D-2D homography H between the 3D plane and one of the at least two images using the features and the 3D plane; and using the 3D-2D homography H to determine the first pose.

2. The method of claim 1, further comprising performing an augmented reality application with the second mobile platform based on the second pose of the second mobile platform with respect to the planar object.

3. The method of claim 1, wherein determining the second pose of the second mobile platform with respect to the planar object using the image of the planar object captured by the second mobile platform and the reference image comprises:
   extracting features from the reference image;
   defining 3D points on a 3D plane that correspond to the features extracted from the reference image;
   finding points in the image of the planar object captured by the second mobile platform that match with 2D projections of the 3D points; and
   using matched 3D-2D point pairs to estimate the second pose of the second mobile platform.

4. The method of claim 3, wherein the features extracted from the reference image comprise point features or line features.

5. The method of claim 1, wherein determining the first pose, comprising the position and the orientation, of the first mobile platform with respect to the planar object is performed by the first mobile platform.

6. The method of claim 1, wherein warping the image of the planar object is performed by the first mobile platform.

7. The method of claim 1, further comprising transmitting the reference image to the second mobile platform.

8. The method of claim 1, further comprising transmitting the at least two images of the planar object by the first mobile platform, wherein determining the first pose, comprising the position and the orientation, of the first mobile platform with respect to the planar object is performed by a server.

9. The method of claim 1, wherein warping the image of the planar object is performed by a server.

10. The method of claim 1, wherein the image of the planar object captured by the first mobile platform that is warped is one of the at least two images of the planar object.

11. The method of claim 1, further comprising capturing an additional image of the planar object with the first mobile platform, wherein the image of the planar object captured by the first mobile platform that is warped is the additional image of the planar object.

12. The method of claim 1, further comprising:
capturing an additional image of the planar object with the first mobile platform;
generating an updated first pose of the first mobile platform with respect to the planar object using the additional image of the planar object and the reference image; and
performing an augmented reality application with the first mobile platform based on the updated first pose of the first mobile platform with respect to the planar object.

13. The method of claim 1, further comprising:
using the second mobile platform to capture a new image that includes a portion of the planar object that is not included in the reference image of the front view of the planar object;
merging the new image and the reference image to generate a new reference image of the front view of the planar object; and
determining an updated second pose of the second mobile platform with respect to the planar object using a subsequent image of the planar object captured by the second mobile platform and the new reference image.

14. The method of claim 13, wherein merging the new image and the reference image to generate the new reference image of the front view of the planar object comprises transforming pixels of the reference image to the new reference image through an identity transformation and transforming pixels of the new image to the new reference image.

15. The method of claim 14, wherein transforming pixels of the new image to the new reference image is performed using at least one of a computed homography or affine transformation.

16. The method of claim 1, wherein both of the at least two images of the planar object are captured by the first mobile platform.

17. The method of claim 1, wherein one of the at least two images of the planar object is captured by the first mobile platform and another of the at least two images of the planar object is captured by the second mobile platform.

18. The method of claim 1, wherein warping the image of the planar object captured by the first mobile platform using the orientation of the first mobile platform comprises using a computed homography.

19. The method of claim 1, wherein warping the image of the planar object produces a warped image, the method further comprising translating and scaling the warped image to produce the reference image of the front view of the planar object.

20. An apparatus comprising: an interface for receiving at least two images to be processed, the at least two images containing different views of a planar object, wherein at least one of the at least two images is captured by a first camera; a data transmitting interface; a processor connected to the interface for receiving at least two images to be processed and the data transmitting interface; memory connected to the processor; and software held in the memory and configured to cause the processor to analyze the at least two images of the planar object and to determine a pose, comprising a position and an orientation, of the first camera with respect to the planar object using the at least two images, to warp an image of the planar object using the orientation to produce a reference image of a front view of the planar object, to transmit the reference image to a mobile platform with a second camera via the data transmitting interface to perform a multi-user augmented reality application using the reference image; wherein the software held in the memory is configured to cause the processor to determine the pose of the first camera with respect to the planar object comprises software held in the memory and run in the processor to extract features from the at least two images, to compute a 2D-2D homography h between the at least two images using the features, to compute 3D coordinates for the features to define a 3D plane that corresponds to a plane of the planar object, to compute a 3D-2D homography H between the 3D plane and one of the at least two images using the features and the 3D plane, and to use the 3D-2D homography H to determine the pose.

21. The apparatus of claim 20, wherein the apparatus is a server, wherein the interface for receiving at least two images to be processed and the data transmitting interface is an external interface, and wherein the reference image is transmitted to a plurality of mobile platforms.

22. The apparatus of claim 20, wherein the apparatus is a first mobile platform further comprising the first camera, wherein the interface for receiving at least two images to be processed is an interface between the first camera and the processor, and wherein the data transmitting interface is a wireless transceiver.

23. The apparatus of claim 22, wherein software held in the memory is configured to cause the processor to perform the multi-user augmented reality application using the reference image comprises software to causes the processor to update the pose of the first camera with respect to the planar object using the reference image and an additional image of the planar object.

24. The apparatus of claim 23, wherein the software to cause the processor to update the pose of the first camera comprises software to extract features from the reference image, to define 3D points on a 3D plane that correspond to the features extracted from the reference image, to find points in the additional image of the planar object that match with 2D projections of the 3D points, and to use the matched 3D-2D point pairs to update the pose.

25. The apparatus of claim 20, wherein the image of the planar object that is warped to produce the reference image is one of the at least two images of the planar object.

26. The apparatus of claim 20, wherein the image of the planar object that is warped to produce the reference image is an additional image of the planar object.

27. The apparatus of claim 20, wherein the software held in the memory is configured to cause the processor to merge the reference image and a new image that includes a portion of the planar object that is not included in the reference image to generate a new reference image of the front view of the planar object, to transmit the new reference image to the mobile platform with the second camera via the data transmitting interface to perform the multi-user augmented reality application using the new reference image.

28. The apparatus of claim 27, wherein the software held in the memory is configured to cause the processor to merge the new image and the reference image to generate the new reference image by transforming pixels of the reference image to the new reference image through an identity transformation and transforming pixels of the new image to the new reference image using at least one of a computed homography or affine transformation.

29. The apparatus of claim 20, wherein the software held in the memory is configured to cause the processor to warp the image of the planar object using a computed homography.

30. The apparatus of claim 20, wherein the software held in the memory is configured to cause the processor to warp the image of the planar object to produce a warped image, wherein the software held in the memory and run in the processor further causes the processor to translate and scale the warped image to produce the reference image of the front view of the planar object.

31. A mobile platform comprising: a camera; a wireless transceiver; a processor connected to the camera and the wireless transceiver; memory connected to the processor; a display connected to the memory; and software held in the memory and configured to cause the processor to analyze at least two captured images of a planar object and to determine a pose, comprising a position and an orientation, of the mobile platform with respect to the planar object using the at least two captured images, to warp an image of the planar object using the orientation to produce a reference image of a front view of the planar object, to transmit the reference image to at least one other mobile platform, and to perform a multi-user augmented reality application with the at least one other mobile platform using the reference image and that is displayed on the display; wherein the software held in the memory is configured to cause the processor to determine the pose of the first camera with respect to the planar object comprises software held in the memory and run in the processor to extract features from the at least two images, to compute a 2D-2D homography h between the at least two images using the features, to compute 3D coordinates for the features to define a 3D plane that corresponds to a plane of the planar object, to compute a 3D-2D homography H between the 3D plane and one of the at least two images using the features and the 3D plane, and to use the 3D-2D homography H to determine the pose.

32. A system comprising: means for capturing at least two images of a planar object; means for determining a first pose, comprising a position and an orientation, of a first mobile platform with respect to the planar object using the at least two images; means for warping an image of the planar object using the orientation of the first mobile platform with respect to the planar object to produce a reference image of a front view of the planar object; and means for determining a second pose of a second mobile platform with respect to the planar object using a second image of the planar object captured by the second mobile platform and the reference image; wherein means for determining the first pose, comprising the position and the orientation, of the first mobile platform with respect to the planar object comprises: means for extracting features from the at least two images; means for computing a 2D-2D homography h between the at least two images using the features; means for computing 3D coordinates for the features to define a 3D plane that corresponds to a plane of the planar object; means for computing a 3D-2D homography H between the 3D plane and one of the at least two images using the features and the 3D plane; and means for using the 3D-2D homography H to determine the first pose.

33. The system of claim 32, further comprising a means for performing an augmented reality application with the second mobile platform based on the second pose of the second mobile platform with respect to the planar object.

34. The system of claim 32, wherein the first mobile platform comprises the means for determining the pose, comprising the position and the orientation, with respect to the planar object and the means for warping the image of the planar object, and the first mobile platform further comprises means for transmitting the reference image to the second mobile platform.

35. The system of claim 32, further comprising a server comprising the means for determining the pose, comprising the position and the orientation, with respect to the planar object and the means for warping the image of the planar object, and the server further comprising means for receiving the at least two images of the planar object and means for transmitting the reference image to the second mobile platform.

36. The system of claim 32, wherein the image of the planar object that is warped comprises one of the at least two images of the planar object or an additional image of the planar object.

37. The system of claim 32, further comprising means to merge the reference image and a new image that includes a portion of the planar object that is not included in the reference image to generate a new reference image of the front view of the planar object wherein the means for determining the second pose of the second mobile platform updates the second pose of the second mobile platform with respect to the planar object using a different image of the planar object captured by the second mobile platform and the new reference image.

38. The system of claim 37, wherein the means to merge the new image and the reference image to generate the new reference image transforms pixels of the reference image to the new reference image through an identity transformation and transforms pixels of the new image to the new reference image using at least one of a computed homography or affine transformation.

39. The system of claim 32, wherein the means for warping the image of the planar object using the orientation of the first mobile platform uses a computed homography that includes translation and the orientation.

40. The system of claim 32, wherein the means for warping the image of the planar object produces a warped image, the system further comprising means for translating and scaling the warped image to produce the reference image of the front view of the planar object.

41. A non-transitory computer-readable medium including program code stored thereon, comprising: program code to analyze at least two images of a planar object to determine a pose, comprising a position and an orientation, of a camera that captured at least one of the at least two images with respect to the planar object; program code to warp an image of the planar object using the orientation to produce a reference image of a front view of the planar object; program code to transmit the reference image; and program code to perform a multi-user augmented reality application using the reference Image; wherein the program code to determine the pose of the first camera with respect to the planar object comprises program code to extract features from the at least two images, to compute a 2D-2D homographs h between the at least two images using the features, to compute 3D coordinates for the features to define a 3D plane that corresponds to a plane of the planar object, to compute a 3D-2D homographs H between the 3D plane and one of the at least two images using the features and the 3D plane, and to use the 3D-2D homographs H to determine the pose.

42. The non-transitory computer-readable medium of claim 41, further comprising:
   program code to merge the reference image and a new image that includes a portion of the planar object that is not included in the reference image to generate a new reference image of the front view of the planar object;
   program code to transmit the new reference image; and
   program code to perform the multi-user augmented reality application using the new reference image.

43. The non-transitory computer-readable medium of claim 42, wherein the program code to merge the new image and the reference image to generate the new reference image comprises:
   program code to transform pixels of the reference image to the new reference image through an identity transformation;
   program code to transform pixels of the new image to the new reference image using at least one of a computed homography or affine transformation.

* * * * *